Dec. 14, 1937.  F. C. ELDER  2,102,358
TIRE WIRE
Filed Nov. 18, 1935
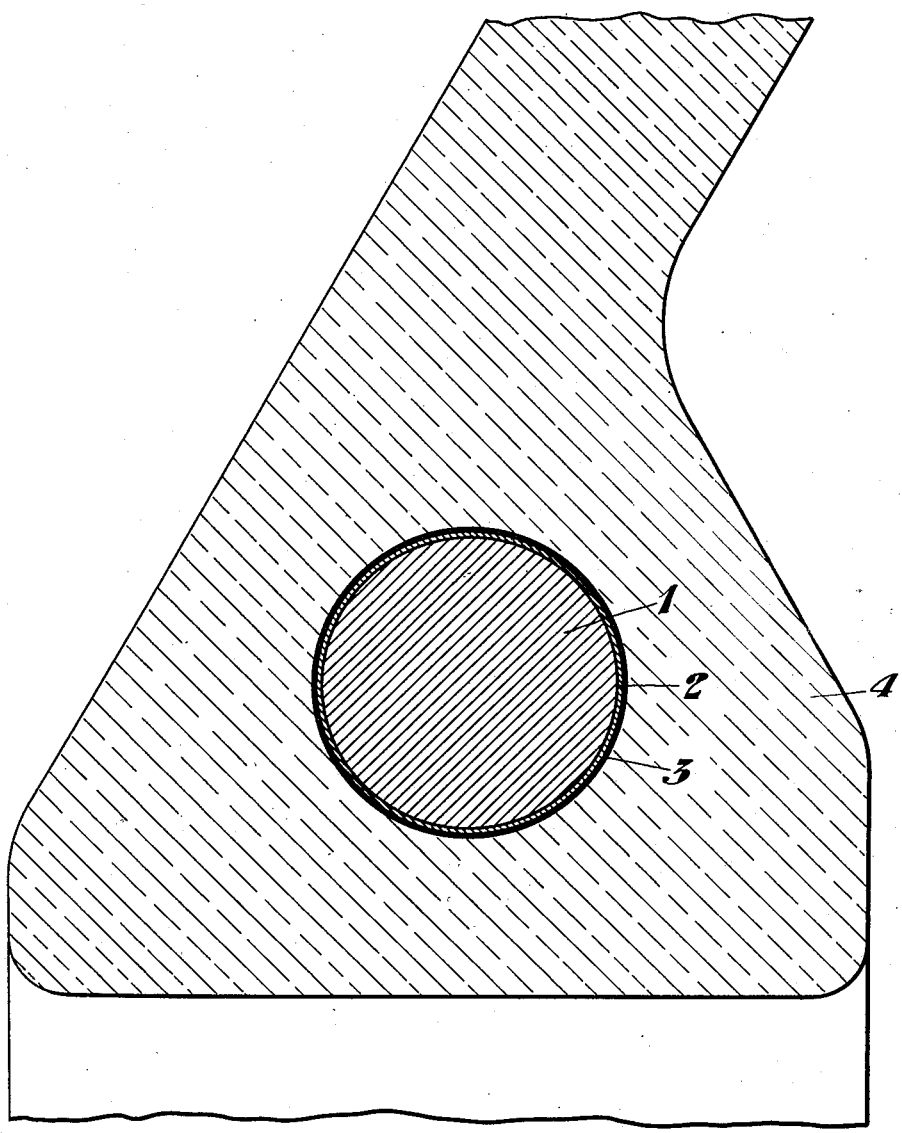
Inventor:
FLINT C. ELDER,
by: Usina & Rauber
his Attorneys.

Patented Dec. 14, 1937

2,102,358

UNITED STATES PATENT OFFICE 2,102,358

TIRE WIRE

Flint C. Elder, Cleveland, Ohio, assignor to The American Steel and Wire Company of New Jersey, a corporation of New Jersey Application November 18, 1935, Serial No. 50,469

3 Claims. (Cl. 245—1.5)

This invention relates particularly to tire wire, although its principles may be applied wherever it is necessary to vulcanize rubber to steel, one of the objects being to protect steel against corrosion while increasing its ability to form a strong bond with rubber vulcanized to it. Other objects may be inferred from the following disclosure.

As is well known, tire wire is used to form the beads of automobile tires. This tire wire is made of steel and is ordinarily chemically copper or brass coated for the purpose of securing firm adherence with the tire rubber. Since this coating is relatively thin and sometimes discontinuous the steel is not adequately protected against corrosion.

According to the present invention, tire wire is made by galvanizing the wire, which may be done in any conventional manner, and then passing the wire through a silver salt solution so as to deposit at least traces of silver on the wire. Preferably, this is done so that silver is deposited on the galvanized coating in the form of a relatively thin but appreciable plating of silver. This may be done without resorting to the use of electricity, the chemical action of the silver solution being sufficient. A water solution of silver nitrate and potassium cyanide is preferably used.

The accompanying drawing illustrates the combination of a steel tire wire 1 having the galvanized coating 2 and the relatively thin but appreciable plating of silver 3 on the outer surface of this coating 2. A rubber body 4, which may be the rubber portion of an automobile tire, is vulcanized to the tire wire 1.

It is obvious that the steel is adequately protected from corrosion, the value of galvanizing being well known. Furthermore, and this has not heretofore been known, firm adherence with the rubber 4 is secured by the silver plate. A very thin deposit of silver, or even traces of silver, renders the galvanized wire capable of properly bonding with rubber.

I claim:

1. The combination of a steel object having a galvanized coating and bearing at least traces of silver on the outer surface of said coating, and a rubber body vulcanized to said steel object, whereby said object is protected from corrosion by said coating and firm adherence with said rubber body is secured by said silver.

2. The combination of a steel object having a galvanized coating and a relatively thin but appreciable plating of silver on the outer surface of said coating, and a rubber body vulcanized to said steel object, whereby said object is protected from corrosion by said coating and firm adherence with said rubber body is secured by said silver plating.

3. A method of making an article having a steel part with rubber vulcanized to the same, said method including galvanizing a surface of the steel part, depositing at least traces of silver on the resulting galvanized surface and vulcanizing the rubber to said surface.

FLINT C. ELDER.